US008644042B2

(12) United States Patent
Chang et al.

(10) Patent No.: US 8,644,042 B2
(45) Date of Patent: Feb. 4, 2014

(54) ALTERNATE CURRENT RECTIFIER CIRCUIT AND POWER CIRCUIT

(75) Inventors: Te-Ming Chang, New Taipei (TW); Kuo-Hsiang Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 13/172,863

(22) Filed: Jun. 30, 2011

(65) Prior Publication Data
US 2012/0262964 A1    Oct. 18, 2012

(30) Foreign Application Priority Data
Apr. 18, 2011    (TW) .............................. 100113308 A

(51) Int. Cl.
*H02M 7/217*    (2006.01)
(52) U.S. Cl.
USPC .......................................... 363/127; 363/126
(58) Field of Classification Search
USPC ............................................ 363/126, 17, 127
See application file for complete search history.

(56) References Cited

U.S. PATENT DOCUMENTS

| 6,538,905 | B2 * | 3/2003 | Greenfeld et al. | .............. | 363/17 |
| 2011/0242854 | A1 * | 10/2011 | Minami et al. | .................. | 363/17 |

OTHER PUBLICATIONS

"DCM/CCM Isolated PFC Single-Stage AC/DC Converter", Ficagna et al., Power Electronics Conference, 2009. COBEP '09. Brazilian, pp. 641-647.*
"Single Stage Full Bridge Converter With Power Factor Correction," Anunciada et al., Power Electronics Specialists Conference, 2001. PESC. 2001 IEEE 32nd Annual, pp. 1566-1570 vol. 3.*
A. K. S. Bhat and R. Venkatraman, "A soft-switched full-bridge single-stage ac-to-dc converter with low line current harmonic distortion", in IEEE Trans. on Ind. Elec., vol. 52, No. 4, pp. 1109-1116, Aug. 2005.*

* cited by examiner

*Primary Examiner* — Adolf Berhane
*Assistant Examiner* — Jye-June Lee
(74) *Attorney, Agent, or Firm* — Altis Law Group, Inc.

(57) ABSTRACT

An alternate current rectifier circuit which includes a first diode, a second diode, a first transistor, a second transistor, a third transistor, and a fourth transistor is power saving. The first diode is connected to the first transistor and the fourth transistor; the second diode is connected to the second transistor and the third transistor. During a positive half cycle of the alternate current, the first transistor and the fourth transistor are switched on and the alternate current flows through the first diode, the first transistor, and the fourth transistor; during a negative half cycle of the alternate current, the second transistor and the third transistor are switched on and the alternate current flows through the second diode, the second transistor, and the third transistor.

9 Claims, 3 Drawing Sheets

ALTERNATE CURRENT RECTIFIER CIRCUIT AND POWER CIRCUIT

BACKGROUND

1. Technical Field

The present disclosure relates to rectifier circuits, and particularly, to an alternate current rectifier circuit and a power circuit using same.

2. Description of Related Art

Rectifier circuits are used for rectifying an alternate current into a direct current. A typical rectifier circuit is composed of four diodes connected to each other. Each of the diodes has a threshold voltage, such as 0.4V. When an alternate current, for example 10A, flows through the diode, the power consumption of the diode will be about 4 W. Therefore, the rectifier circuits waste power.

Therefore, it is desirable to provide an alternate current rectifier circuit, which can overcome the limitations described above.

DETAILED DESCRIPTION

Exemplary embodiments of the disclosure will now be described in detail, with reference to the accompanying drawings.

Figure 1:
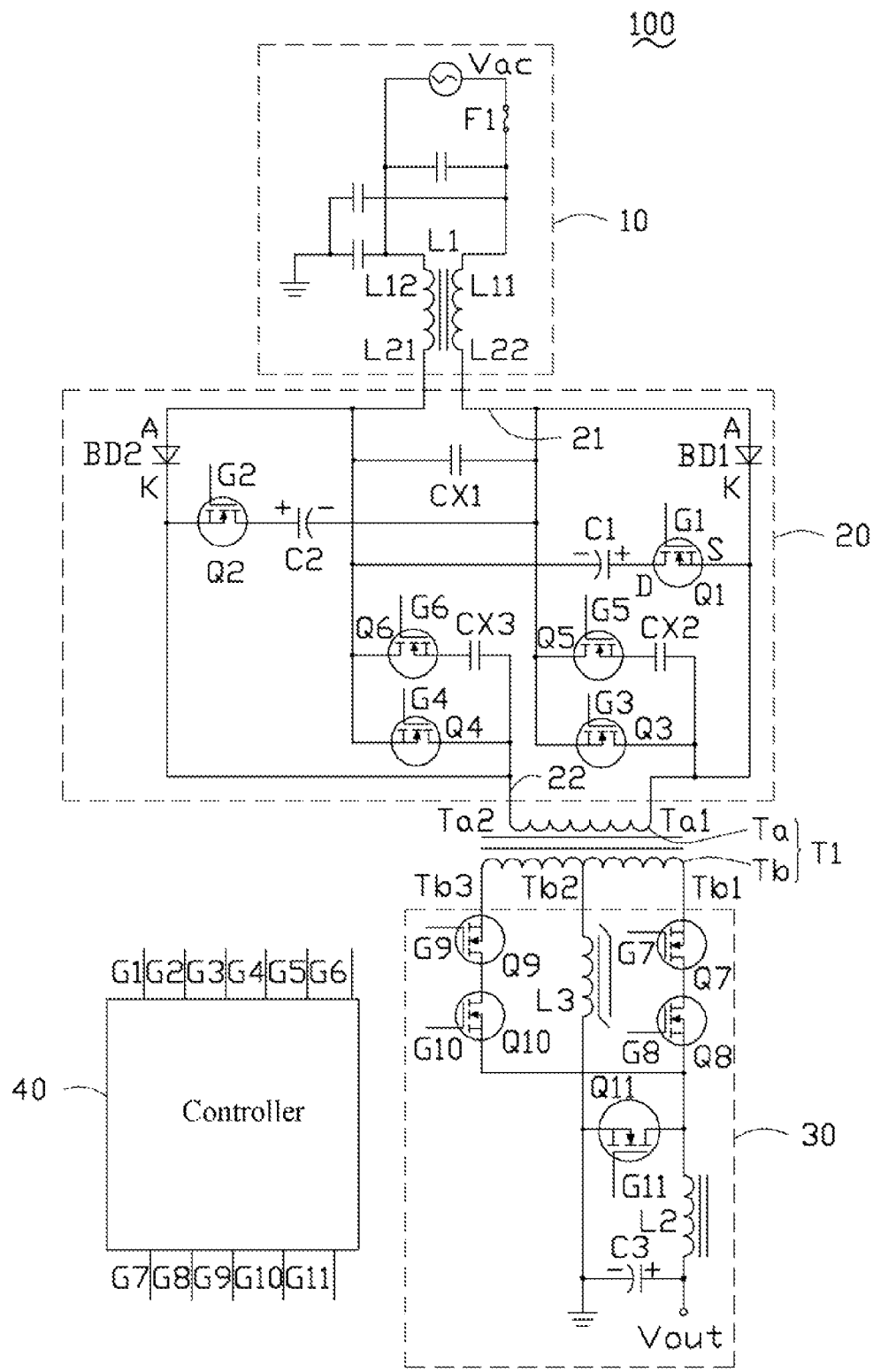
FIG. 1 is a circuit diagram of a power circuit, according to an exemplary embodiment.

FIG. 1 is a circuit diagram of a power circuit 100, according to an exemplary embodiment. The power circuit 100 includes an antistatic circuit 10, an alternate current rectifier circuit 20, a transformer T1, a direct current rectifier circuit 30, and a controller 40.

The antistatic circuit 10 includes a fuse F1, a differential mode (DM) inductor L1, and three capacitors. The DM inductor L1 includes a first front input terminal L11, a second front input terminal L12, a first rear input terminal L21, and a second rear input terminal L22. The first front input terminal L11 is grounded via a first capacitor. The second front input terminal L12 is grounded via a second capacitor. The first front input terminal L11 is connected to the second front input terminal L12 via a third capacitor. An alternate current power Vac is connected between the first front input terminal L11 and the second front input terminal L12. The fuse F1 is connected between the alternate current power Vac and the first front input terminal L11.

The alternate current rectifier circuit 20 includes two alternating input terminals 21 and two alternating output terminals 22. The two alternating input terminals 21 are respectively connected to the first rear input terminal L21 and the second rear input terminal L22. The two alternating output terminals 22 are connected to the transformer T1.

The alternate current rectifier circuit 20 includes first, second diodes BD1, BD2, first, second, third, fourth, fifth, sixth transistors M1, M2, M3, M4, M5, M6, first, second, third non-polarized capacitors CX1, CX2, CX3, and first, second polarized capacitors C1, C2. Each of the diodes BD1, BD2 includes an anode A and a cathode K. Each of the transistors includes a first terminal S, a second terminal D, and a control terminal G configured for controlling the connection and the disconnection of the first terminal S to the second terminal D. Each of the polarized capacitors includes a positive terminal and a negative terminal. In this embodiment, the control terminal G of the ith transistor is labeled as Gi (where i ranges from 1-11). Each of the transistors is a N-channel MOSFET, and the first terminal S is source, the second terminal D is drain, and the control terminal G is gate.

The anode of first diode BD1 serves as one of the alternating input terminals 21, and the cathode serves as one of the alternating output terminals 22. The anode of second diode BD2 serves as the other alternating input terminal 21, and the cathode serves as the other alternating output terminal 22. The first non-polarized capacitor CX1 is connected between the cathodes of the first diode BD1 and the second diode BD2. The cathode of the first diode BD1 is connected to the first terminal S of the first transistor M1 and the second terminal D of the third transistor M3. The cathode of the second diode BD2 is connected to the first terminal S of the second transistor M2 and the second terminal D of the fourth transistor M4. The positive terminal of the first polarized capacitor C1 is connected to the second terminal D of the first transistor M1, and the negative terminal is connected to the first terminal S of the fourth transistor M4. The positive terminal of the second polarized capacitor C2 is connected to the second terminal D of the second transistor M2, and the negative terminal is connected to the first terminal S of the third transistor M3. The first terminal S of the third transistor M3 is connected to the anode of the first diode BD1. The first terminal S of the fourth transistor M4 is connected to the anode of the second diode BD2. The second non-polarized capacitor CX2 is connected between the second terminal D of the third transistor M3 and the first terminal S of the fifth transistor M5. The second terminal D of the fifth transistor M5 is connected to the anode of the first diode BD1. The third non-polarized capacitor CX3 is connected between the second terminal D of the fourth transistor M4 and the first terminal S of the sixth transistor M6. The second terminal D of the sixth transistor M6 is connected to the anode of the second diode BD2.

The transformer T1 includes a primary coil Ta and a secondary coil Tb coupled with the primary coil Ta. The primary coil Ta includes a first primary output terminal Ta1 and a second primary output terminal Ta2. The secondary coil Tb includes a first secondary output terminal Tb1, a second secondary output terminal Tb2, and a third secondary output terminal Tb3. The first primary output terminal Ta1 and the second primary output terminal Ta2 are respectively connected to the two alternating output terminals 22. The second secondary output terminal Tb2 is positioned between the first secondary output terminal Tb1 and the third secondary output terminal Tb3.

The direct current rectifier circuit 30 includes seventh, eighth, ninth, tenth, eleventh transistors M7, M8, M9, M10, M11, a common mode (CM) inductor L2, a third polarized capacitor C3, and a soft switching inductor L3. The first terminal S of the seventh transistor M7 is connected to the first secondary output terminal Tb1. The second terminal D of the seventh transistor M7 is connected to the second terminal D of the eighth transistor M8. The first terminal S of the eighth transistor M8 is connected to a main output terminal Vout via the CM inductor 12. The first terminal S of the ninth transistor M9 is connected to the third secondary output terminal Tb3. The second terminal D of the ninth transistor M9 is connected to the second terminal D of tenth transistor M10. The first terminal S of the eleventh transistor M11 is grounded. The second terminal D of eleventh transistor M11 is connected to the first terminal S of the eighth transistor M8. The positive terminal of the third polarized capacitor C3 is connected to the main output terminal Vout, and the negative terminal is grounded. The soft switching inductor L3 is connected between the second secondary output terminal Tb2 and the ground.

The controller 40 is connected to the control terminals G1-G11 of the transistors M1-M11, and configured for controlling the connection and disconnection of the first terminal S to the second terminal D.

In use, the alternate current output from the alternate current power Vac consists of a waveform having a positive half cycle and a negative half cycle. The antistatic circuit 10 is configured for filtering noise of the alternate current, and preventing high frequency signals generated by the power circuit 100 from flowing into a power circuit (not shown) which provides the alternate current power Vac.

Figure 2:
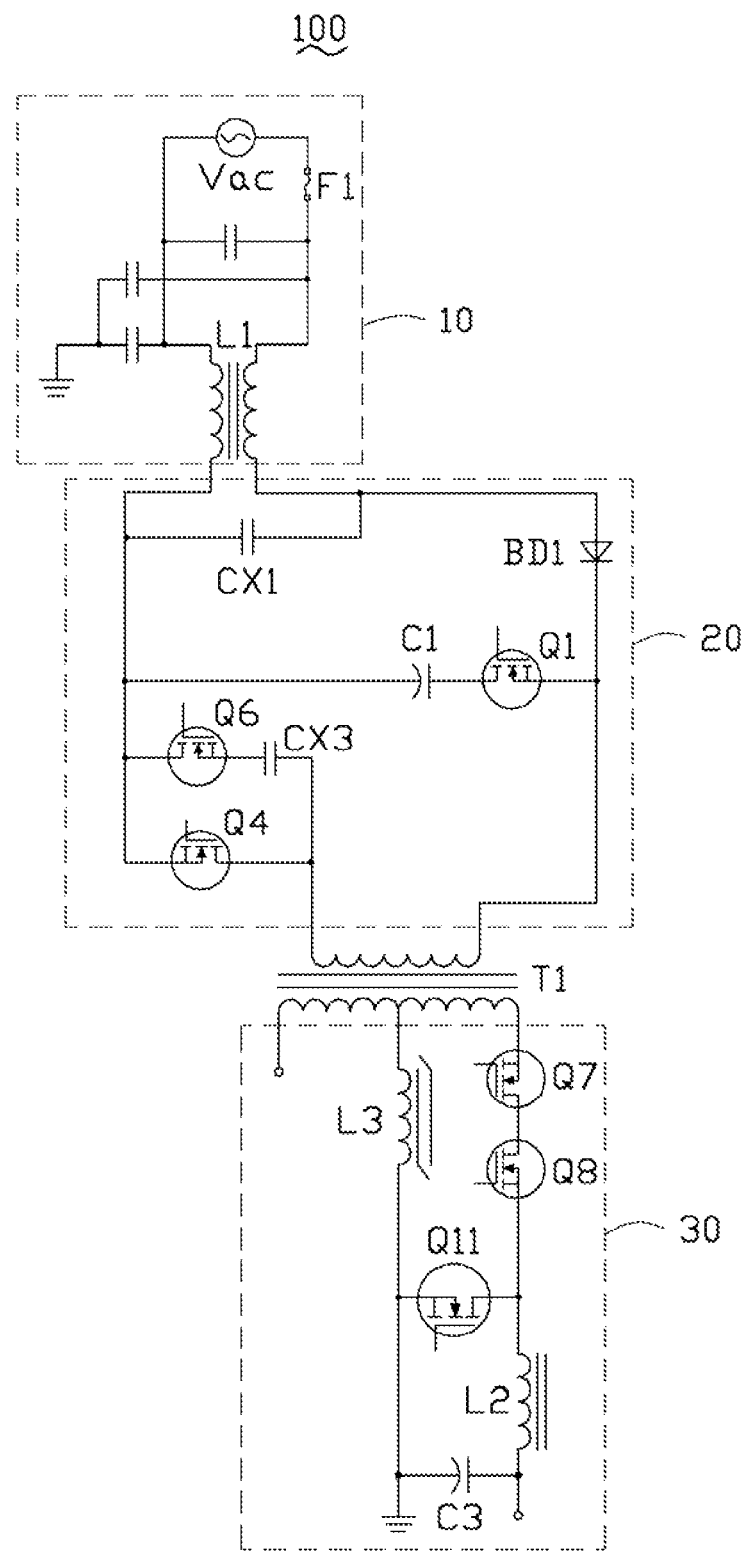
FIG. 2 is an equivalent circuit diagram of the power circuit, which is working at a positive half cycle of an alternate current.

Referring to FIG. 1 and FIG. 2, during the positive half of the alternate current, the controller 40 outputs a high level, such as +5V, to the control terminals G1, G4, G7, G8 of the first, fourth, seventh, eighth transistors M1, M4, M7, M8, and outputs a low level, such as 0V, to the control terminals G2, G3, G5, G9, G10 of the second, third, fifth, ninth, tenth transistors M2, M3, M5, M9, M10. Therefore, the first, fourth, seventh, eighth transistors M1, M4, M7, M8 are switched on, and the second, third, fifth, ninth, tenth transistors M2, M3, M5, M9, M10 are switched off.

The alternate current flows into the alternating input terminal 21 through the first rear output terminal L21. A first part of the alternate current flows through the first non-polarized capacitors CX1, and is output to the alternating input terminal 21 connected to the second rear output terminal L22. A second part of the alternate current orderly flows through the first diode BD1, the first transistor M1, and the first polarized capacitor C1, and is output to the alternating input terminal 21 connected to the second rear output terminal L22. A third part of the alternate current orderly flows through the primary coil Ta, and the fourth transistor M4, and is output to the alternating input terminal 21 connected to the second rear output terminal L22. In order to increase the frequency of the alternate current, the controller 40 quickly switches on and switches off the sixth transistor M6. Therefore, the power transferred from the alternate current rectifier circuit 20 to the direct current rectifier circuit 30 by the transformer T1 at each time is decreased. The alternate current flowing through the primary coil Ta is induced to an induction current flowing the secondary coil Tb, and the induction current is output from the first secondary output terminal Tb1. The induction current orderly flows through the seventh transistor M7, the eighth transistor M8, the CM inductor L2, and output from the main output terminal Vout. The seventh transistor M7 is configured for preventing the induction current flowing back to the secondary coil Tb. The eighth transistor M8 is configured for removing a reverse current of the induction current. The seventh transistor M7, the eighth transistor M8, the CM inductor L2, the third polarized capacitor C3, and the soft switching inductor L3 form a charging circuit charging for the third polarized capacitor C3.

Figure 3:
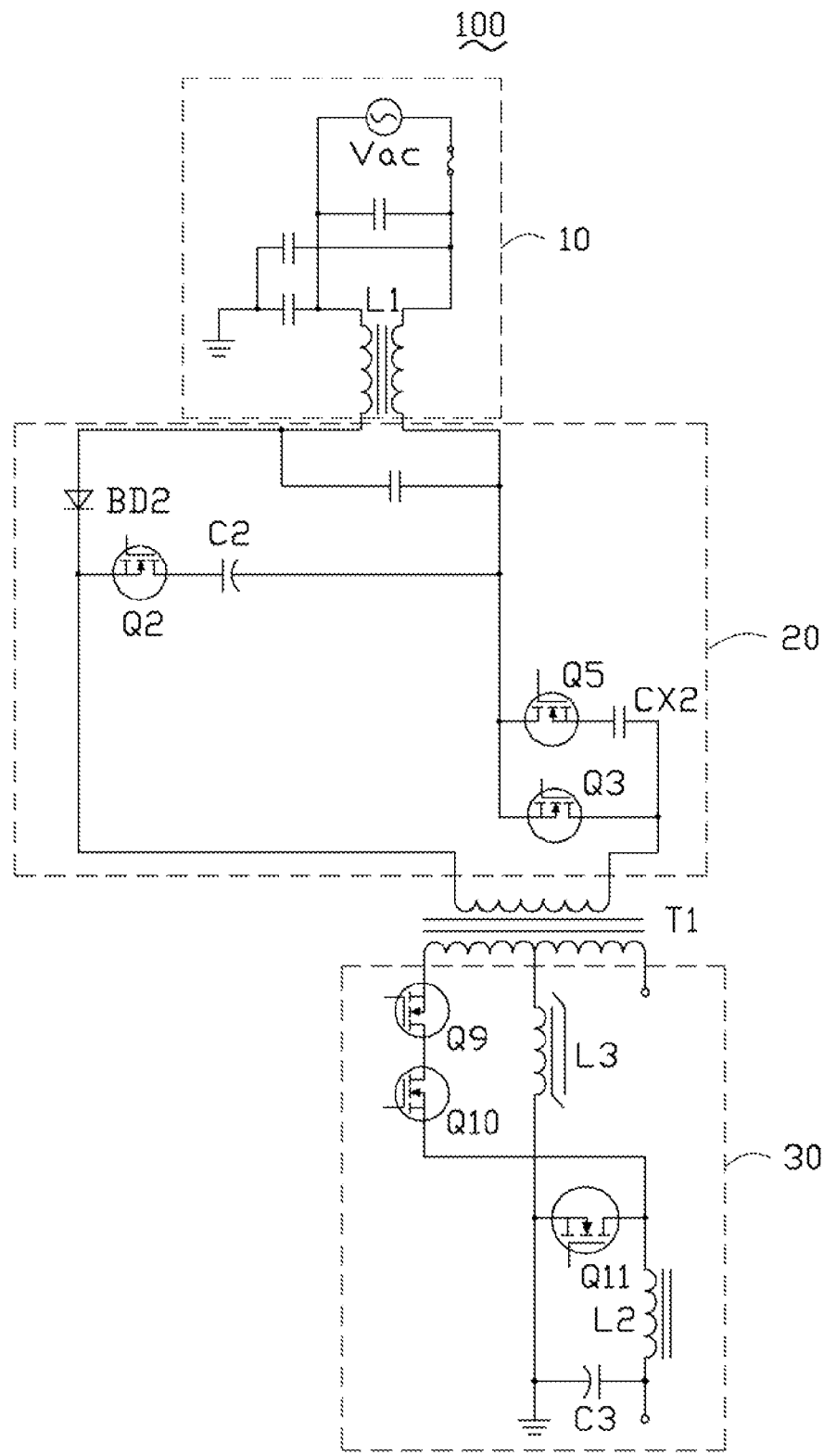
FIG. 3 is an equivalent circuit diagram of the power circuit, which is working at a negative half cycle of the alternate current.

Referring to FIG. 1 and FIG. 3, during the negative half cycle of the alternate current, the controller 40 outputs a high level, such as +5V, to the control terminals G2, G3, G9, G10 of the second, third, ninth, tenth transistors M2, M3, M9, M10, and outputs a low level, such as 0V, to the control terminals G1, G4, G6, G7, G8 of the first, fourth, sixth, seventh, eighth transistors M1, M4, M6, M7, M8. Therefore, the second, third, ninth, and tenth transistors M2, M3, M9, M10 are switched on, and the first, fourth, sixth, seventh, eighth transistors M1, M4, M6, M7, M8 are switched off.

The alternate current flows into the alternating input terminal 21 through the first rear output terminal L21. A first part of the alternate current flows through the first non-polarized capacitor CX1, and is output to the alternating input terminal 21 connected to the second rear output terminal L22. A second part of the alternate current flows orderly through the second diode BD2, the second transistor M2, and the second polarized capacitor C2, and is output to the second rear output terminal L22. A third part of the alternate current flows orderly through the primary coil Ta, and the third transistor M3, and is output to the alternating input terminal 21, which is connected to the second rear output terminal L22. In order to increase the frequency of the alternate current, the controller 40 quickly switches on and switches off the fifth transistor M5. Therefore, the power transferred from the alternate current rectifier circuit 20 to the direct current rectifier circuit 30 by the transformer T1 is decreased each time. The alternate current flowing through the primary coil Ta induces an induction current flowing through the secondary coil Tb, and the induction current is output from the first secondary output terminal Tb1. The induction current flows orderly through the ninth transistor M9, the tenth transistor M10, the CM inductor L2, and is output from the main output terminal Vout. The ninth transistor M9 is configured for preventing the induction current flowing back. The tenth transistor M10 is configured for removing the reverse current. The eleventh transistor M11 is switched on by the controller 40. The eleventh transistor M11, the CM inductor L2, the third polarized capacitor C3, and the soft switching inductor L3 form a discharging circuit. The power of the third polarized capacitor C3 is discharged when the alternate current changes from the positive half cycle to the negative half cycle.

It will be understood that particular exemplary embodiments are shown and described by way of illustration only. The principles and the features of the present disclosure may be employed in various and numerous exemplary embodiments thereof without departing from the scope of the disclosure as claimed. The above-described exemplary embodiments illustrate the scope of the disclosure but do not restrict the scope of the disclosure.

What is claimed is:

1. An alternate current rectifier circuit, comprising:
   two alternating input terminals;
   two alternating output terminals;
   a first diode, a second diode, a non-polarized capacitor, a first transistor, a second transistor, a third transistor, and a fourth transistor; the first diode connected between a first pair of the alternating input terminal and the alternating output terminal, the second diode connected between a second pair of the alternating input terminal and the alternating output terminal; the first transistor and the fourth transistor in parallel connected to the first diode and the alternating input terminal connected to the second diode, the second transistor and the third transistor in parallel connected to the second diode and the alternating input terminal connected to the first diode, the non-polarized capacitor connected between the first diode and the second diode;
   wherein during a positive half cycle of an alternate current, the first transistor and the fourth transistor are switched on and the alternate current flows through the first diode, the first transistor, and the fourth transistor; during a negative half cycle of the alternate current, the second transistor and the third transistor are switched on and the alternate current flows through the second diode, the second transistor, and the third transistor;

wherein each of the first and second diodes comprises an anode and a cathode, each of the first, second, third, and fourth transistors comprises a first terminal, a second terminal, and a control terminal configured for controlling the connection and the disconnection between the first terminal and the second terminal; the non-polarized capacitor is connected between the anode of the first diode and the anode of the second diode; the cathode of the first diode is connected to the first terminal of the first transistor and the second terminal of the third transistor; the cathode of the second diode is connected to the first terminal of the second transistor and the second terminal of the fourth transistor; the second terminal of the first transistor is connected to the anode of the second diode and the first terminal of the fourth transistor; the second terminal of the second transistor is connected to the anode of the first diode and the first terminal of the third transistor; the anodes of the first diode and the second diode serve as the alternating input terminals, the cathodes of the first diode and the second diode serve as the alternating output terminals;

wherein the alternate current rectifier circuit comprises a first polarized capacitor and a second polarized capacitor; the first polarized capacitor comprises a positive terminal connected to the second terminal of the first transistor and a negative terminal connected to the first terminal of the fourth transistor; the second polarized capacitor comprises a positive terminal connected to the second terminal of the second transistor and a negative terminal connected to the first terminal of the third transistor.

2. The alternate current rectifier circuit in claim 1, further comprising a second non-polarized capacitor, a third non-polarized capacitor, a fifth transistor, and a sixth transistor; each of the fifth and sixth transistors comprising a first terminal, a second terminal, and a control terminal configured for controlling the connection and the disconnection between the first terminal and the second terminal; the second non-polarized capacitor connected between the second terminal of the third transistor and the first terminal of the fifth transistor; the second terminal of the fifth transistor connected to the anode of the first diode; the third non-polarized capacitor connected between the second terminal of the fourth transistor and the first terminal of the sixth transistor; the second terminal of the sixth transistor connected to the anode of the second diode.

3. The alternate current rectifier circuit in claim 2, wherein during the positive half cycle of the alternate current, the sixth transistor is switched on and the fifth transistor is switched off; during the negative half cycle of the alternate current, the fifth transistor is switched on and the sixth transistor is switched off.

4. A power circuit, comprising:

an alternate current rectifier circuit having two alternating input terminals and two alternating output terminals, and comprising a first diode, a second diode, a non-polarized capacitor, a first transistor, a second transistor, a third transistor, and a fourth transistor; an alternate current inputting from the alternating input terminals; the first diode connected between a first pair of the alternating input terminal and the alternating output terminal, the second diode connected between a second pair of the alternating input terminal and the alternating output terminal; the first transistor and the fourth transistor in parallel connected to the first diode and the alternating input terminal connected to the second diode, the second transistor and the third transistor in parallel connected to the second diode and the alternating input terminal connected to the first diode, the non-polarized capacitor connected between the first diode and the second diode;

a transformer comprising a primary coil connected between the two alternating output terminals and a secondary coil;

a direct current rectifier circuit connected between the secondary coil and a main output terminal; and a controller configured for switching on the first transistor and the fourth transistor during a positive half cycle of an alternate current and switching on the second transistor and the third transistor during a negative half cycle of the alternate current; the alternate current flowing through the first diode, the first transistor, and the fourth transistor during the positive half cycle and flowing through the second diode, the second transistor, and the third transistor during the negative half cycle;

wherein each of the first and second diodes comprises an anode and a cathode, each of the first, second, third, and fourth transistors comprises a first terminal, a second terminal, and a control terminal configured for controlling the connection and the disconnection between the first terminal and the second terminal; the non-polarized capacitor is connected between the anode of the first diode and the anode of the second diode; the cathode of the first diode is connected to the first terminal of the first transistor and the second terminal of the third transistor; the cathode of the second diode is connected to the first terminal of the second transistor and the second terminal of the fourth transistor; the second terminal of the first transistor is connected to the anode of the second diode and the first terminal of the fourth transistor; the second terminal of the second transistor is connected to the anode of the first diode and the first terminal of the third transistor; the anodes of the first diode and the second diode serve as the alternating input terminals, the cathodes of the first diode and the second diode serve as the alternating output terminals;

the power circuit comprises a first polarized capacitor and a second polarized capacitor; the first polarized capacitor comprises a positive terminal connected to the second terminal of the first transistor and a negative terminal connected to the first terminal of the fourth transistor; the second polarized capacitor comprises a positive terminal connected to the second terminal of the second transistor and a negative terminal connected to the first terminal of the third transistor.

5. The power circuit in claim 4, further comprising an antistatic circuit connected between an alternate current power and the alternating input terminals, and for filtering noise of the alternate current.

6. The power circuit in claim 4, wherein the alternate current rectifier circuit further comprises a second non-polarized capacitor, a third non-polarized capacitor, a fifth transistor, and a sixth transistor; each of the fifth and sixth transistors comprising a first terminal, a second terminal, and a control terminal configured for controlling the connection and the disconnection between the first terminal and the second terminal; the second non-polarized capacitor is connected between the second terminal of the third transistor and the first terminal of the fifth transistor; the second terminal of the fifth transistor is connected to the anode of the first diode; the third non-polarized capacitor is connected between the second terminal of the fourth transistor and the first terminal of the sixth transistor; the second terminal of the sixth transistor is connected to the anode of the second diode.

7. The power circuit in claim 6, further comprising a transformer comprising a primary coil and a secondary coil coupled with the primary coil, the primary coil comprising a first primary output terminal and a second primary output terminal, the secondary coil comprising a first secondary output terminal, a second secondary output terminal, and a third secondary output terminal, the first primary output terminal and the second primary output terminal respectively connected to the two alternating output terminals.

8. The power circuit in claim 7, wherein the direct current rectifier circuit comprises seventh, eighth, ninth, tenth, and eleventh transistors, a CM inductor, a third polarized capacitor, and a soft switching inductor; each of the seventh, eighth, ninth, tenth, and eleventh transistors comprising a first terminal, a second terminal, and a control terminal configured for controlling the connection and the disconnection between the first terminal and the second terminal; the first terminal of the seventh transistor is connected to the first secondary output terminal, the second terminal of the seventh transistor is connected to the second terminal of the eighth transistor, the first terminal of the eighth transistor is connected to the main output terminal via the CM inductor, the first terminal of the ninth transistor is connected to the third secondary output terminal, the second terminal of the ninth transistor is connected to the second terminal of tenth transistor, the first terminal of the eleventh transistor is grounded, the second terminal of eleventh transistor is connected to the first terminal of the eighth transistor, the positive terminal of the third polarized capacitor is connected to the main output terminal, and the negative terminal is grounded, the soft switching inductor is connected between the second secondary output terminal and the ground.

9. The power circuit in claim 8, wherein the controller switches on the first, fourth, seventh, eighth transistors, and switches off the second, third, fifth, ninth, tenth transistors during the positive half cycle of the alternate current, and switches on the first, fourth, seventh, eighth transistors and switches off the second, third, fifth, ninth, tenth transistors during the negative half cycle of the alternate current.

\* \* \* \* \*